(12) United States Patent
Palermiti, II et al.

(10) Patent No.: US 8,495,057 B2
(45) Date of Patent: Jul. 23, 2013

(54) IMAGE SEARCHING WITH RECOGNITION SUGGESTION

(75) Inventors: Michael F. Palermiti, II, Issaquah, WA (US); William Yang, Sammamish, WA (US); Bryan Ferguson, Redmond, WA (US); Robin Counts, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 317 days.

(21) Appl. No.: 12/781,759

(22) Filed: May 17, 2010

(65) Prior Publication Data
US 2011/0282867 A1 Nov. 17, 2011

(51) Int. Cl.
*G06F 17/30* (2006.01)
(52) U.S. Cl.
USPC ............ 707/722; 707/769; 707/E17.03
(58) Field of Classification Search
None
See application file for complete search history.

(56) References Cited

U.S. PATENT DOCUMENTS

| 7,508,419 | B2 | 3/2009 | Toyama et al. | |
|---|---|---|---|---|
| 2009/0006484 | A1 | 1/2009 | Wang | |
| 2009/0252383 | A1 | 10/2009 | Adam et al. | |
| 2009/0315914 | A1* | 12/2009 | Gerhard et al. | 345/630 |
| 2012/0130819 | A1* | 5/2012 | Willcock et al. | 705/14.66 |

OTHER PUBLICATIONS

Edwards; et al., "Proxima: A Mobile Augmented-image Search System"—Published Date: 2008 http://www-scf.usc.edu/~gedwards/pubs/multimedia_2008.pdf.
Suh; et al., "Semi-automatic Image Annotation Using Event and Torso Identification"—Published Date: Apr. 2004 http://hcil.cs.umd.edu/trs/2004-15/2004-15.pdf.
Choi; et al., "Face Annotation for Personal Photos Using"—Published Date: Oct. 30-31, 2008 http://press.liacs.nl/students.mir/Face%20Annotation%20for%20Personal%20Photos%20Using%20Context%20Assisted%20Face%20Recognition.pdf.
Cui; et al., "EasyAlbum: An Interactive Photo Annotation System"—Published Date: Apr. 28-May 3, 2007 http://research.microsoft.com/pubs/69425/easyalbum$_{13}$ sigchi2007.pdf.
"Name Tags: Add Name Tags in Picasa"—Retrieved Date: Apr. 15, 2010 http://picasa.google.com/support/bin/answer.py?hl=en&answer=156272.

* cited by examiner

*Primary Examiner* — Anteneh Girma
(74) *Attorney, Agent, or Firm* — Microsoft Corporation

(57) ABSTRACT

Image management applications allow users to upload, modify, organize, search, and/or share images. Unfortunately, current image management applications may have separate search modes and tagging modes. Accordingly, one or more systems and/or techniques for providing a user with a seamlessly integrated search, view, and/or tag experience are disclosed herein. Search results comprising tagged images and untagged images may be provided in response to a user search query. The untagged images may be contextually relevant to features of the tagged images and/or the user search query. Tagging suggestions for untagged images may be presented that allow a user to confirm or deny a tagging suggestion for an untagged image. Additionally, confirmable thumbnails corresponding to the untagged images may be presented. A confirmable thumbnail may allow a user to confirm or deny tagging a corresponding untagged image.

20 Claims, 12 Drawing Sheets

IMAGE SEARCHING WITH RECOGNITION SUGGESTION

BACKGROUND

Image management applications allow users to upload, modify, organize, tag, and/or share images. In one example, a photo application may allow a user to organize, search, and tag thousands of photos in a single user interface. In another example, a social network may allow users to upload, modify, tag, and share personal photos with other users of the social network. Current image management applications may provide a specific tagging mode that allows a user to tag images (e.g., tag a person and a building within an image). To aid a user in tagging images, an image management application may provide object recognition functionality while in a tagging mode. The object recognition functionality may allow the image management application to provide tagging suggestions to users while in the tagging mode. In one example of tagging an image, a user may tag an individual, a monument, a car, a location, and/or a variety of other object within images by assigning textual labels for the tagged objects. Tags provide contextual information about images that may be useful when organizing, search, and sharing images. For example, in response to a user searching for images of "Doug", an image management application may present the user with tagged images having tags corresponding to "Doug".

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Among other things, one or more systems and/or techniques for presenting search results are disclosed herein. In particular, a user search query may be received. In one example, the user search query may be received while a user is within a search/view mode, as opposed to a tagging-centric mode of an image management application. The user search query may be a textual string or information associated with an image tile. The user search query may be matched to tagged information of images and/or features of untagged images.

Tagged search result images corresponding to the user search query may be determined. That is, tagged images having previously tagged information matching the user search query may be determined as tagged search results images. For example, a tagged image of a building tagged "The Tower", a tagged image of an outdoor scene tagged "Tower", and/or other tagged images may be determined as tagged search results images corresponding to a user search query "The Tower".

Untagged image recognition suggestions may be determined based upon untagged images corresponding to recognized features of one or more tagged search result images and/or the user search query. It may be appreciated that an untagged image recognition suggestion may be interpreted as an untagged image contextually relevant to a user's current search. Image recognition techniques may be utilized to determine features of untagged images that are similar to features of tagged images. In this way, untagged images may be assigned features and/or grouped into recognition suggestion groups based upon feature recognition matching. In one example, untagged images may be determined as untagged image recognition suggestions based upon untagged images having features corresponding to features of tagged search result images and/or the user search query. In another example, untagged images within a recognition suggestion group corresponding to features of tagged search result images and/or the user search query may be determined as untagged image recognition suggestions.

Search results comprising one or more untagged image recognition suggestions and/or one or more tagged search result images may be presented. It may be appreciated that in one example, the search results may be presented to a user engaged in an image search/view mode. Additionally, tagging suggestions for untagged image recognition suggestions within the search results may be presented to the user. That is, even though the user may be in a search/view mode, the user may confirm, deny, or create tagging information for untagged images represented by untagged image recognition suggestions within the presented search results. Additionally, confirmable thumbnails may be presented to the user. A confirmable thumbnail may correspond to one or more untagged image recognition suggestions. In this way, a user may confirm, deny, or create tagging information for untagged images represented by confirmable thumbnails.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
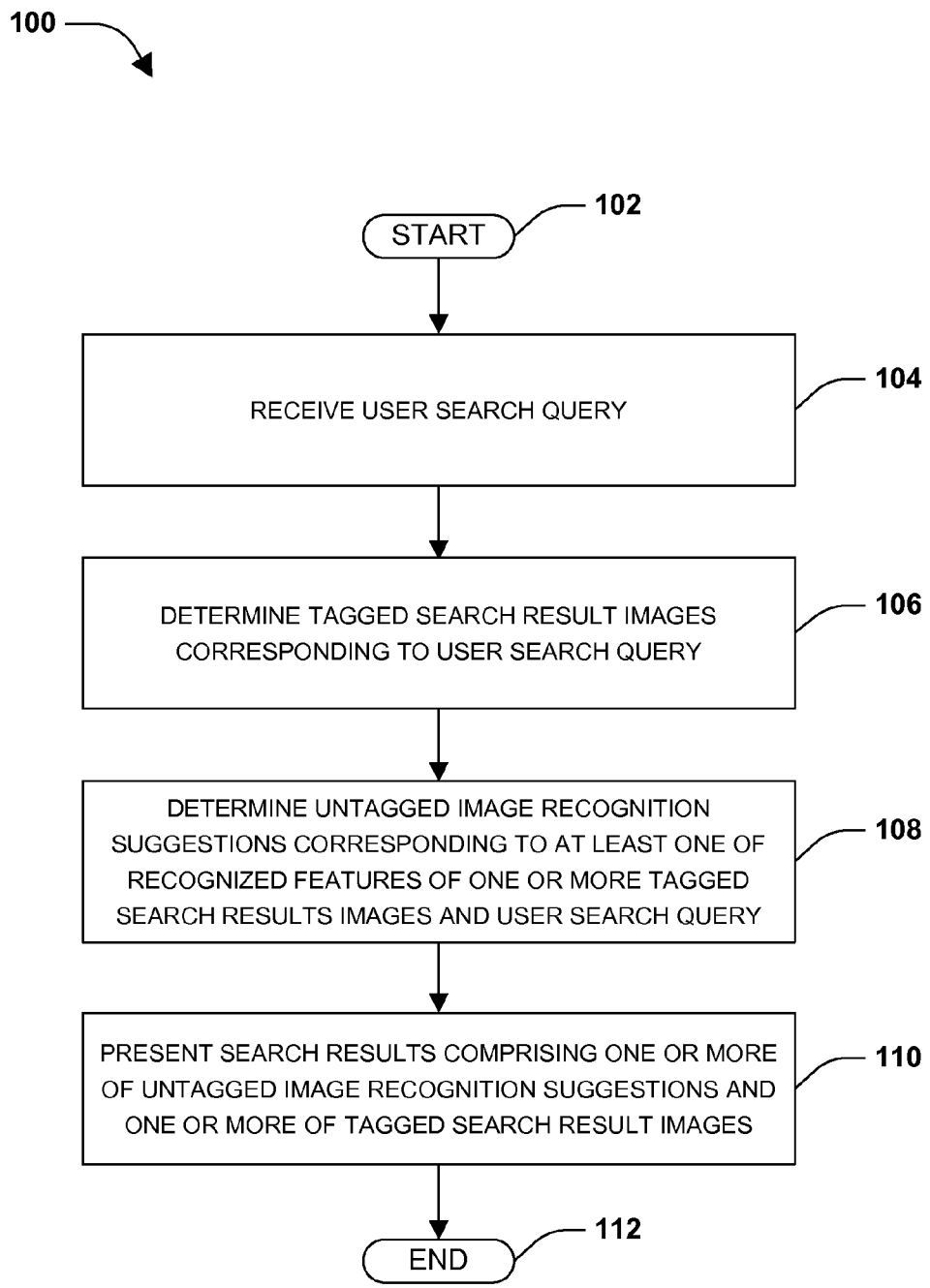
FIG. 1 is a flow chart illustrating an exemplary method of presenting search results.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

Current image management applications allow users to upload, modify, organize, search, and/or share images (e.g., digital photos, digitally generated images, etc.). Many image management applications may provide a search/view mode that allows a user to search and browse images. In addition, image management applications may provide a tagging mode that allows users to tag images. Unfortunately, users are not provided with a single seamless experience when search, viewing, and tagging images because there is a lack of integration between search/view features and tagging feature. For example, a user may enjoy searching and view photos. However, the user may have to switch into a specific tagging-centric mode to perform the task of tagging images. Switching into the tagging mode may be a disruptive and intimidating experience for users who have rarely tagged images before. The task off tagging hundreds or thousands of images may be daunting to a user to a point that the user rarely tags images. It may be advantageous to provide a user with a seamless search/view/tag experience that provides contextually relevant tagging suggestions so that users may tag untagged images while searching and/or viewing tagged images.

Accordingly, one or more systems and/or techniques for presenting search results are provided herein. In particular, tagging suggestions may be provided to a user as part of a seamless user experience, such that the user may search, view, and tag images without having to venture in to a specific tagging-centric mode to tag images. This allows a user to search/view/tag images without changing workflow between searching/viewing tagged images and tagging untagged images utilizing feature recognition suggestions. For example, untagged images having features relating to a search task may be presented as untagged image recognition suggestions for the user to confirm or deny. In this way, the user is presented with untagged images contextually relevant to currently searched/viewed tagged images.

One embodiment of presenting search results is illustrated by an exemplary method 100 in FIG. 1. At 102, the method begins. At 104, a user search query is received. In one example, the user search query may be received from a user engaged with an image management application while in a non-tagging exclusive mode (e.g., a mode that allows a user to search and view tagged images, a mode that allows a user to edit images, etc.). At 106, tagged search result images corresponding to the user search query may be determined. It may be appreciated that one or more images may be associated with tagged information (e.g., a user tags an image as "My Vacation", a user tags a person as "Doug" and another person as "Colleen" within an image, etc.). The user search query may be used to locate tagged images having tagged information corresponding to the user search query (e.g., text matching between the user search query and tagged information).

At 108, untagged image recognition suggestions corresponding to recognized features of one or more tagged search result images and/or the user search query may be determined. It may be appreciated that an untagged image recognition suggestion may be interpreted as an untagged image, which may be suggested to a user for tagging. In particular, features of untagged images may be determined using feature recognition technology (e.g., facial recognition technology). In one example, untagged images may be grouped into recognition suggestion groups of untagged images having similar features. In this way, untagged images and/or recognition suggestion groups of untagged images having features corresponding to recognized feature of tagged search result images and/or the user search query may be retrieved as untagged image recognition suggestions. It may be appreciated that a variety of recognition techniques and/or grouping techniques are contemplated as falling within the scope of the claimed subject matter.

At 110, search results comprising one or more of the untagged image recognition suggestions and/or one or more of the tagged search result images may be presented. For example, tagged images and untagged images may be presented within a single search/view window to a user engaged in a default mode, a search mode, a view mode, and/or modes other than a mode dedicated exclusively to tagging images. Tagging suggestions for untagged image recognition suggestions may be presented. A tagging suggestion may comprise a suggested tag label, a confirmation input, and a denial input. User input to confirm or deny a tagging suggestion may be received. If the user input confirms the tagging suggestion, then an untagged image represented by the untagged image recognition suggestions may be tagged. If the user input denies the tagging suggestion, then the untagged image recognition may be removed from the presented search results. It may be appreciated that an object recognition component and/or technique may be trained based upon the user input (e.g., a user denying a tagging suggestion may indicate features of the corresponding untagged image recognition suggestion do not correspond to the user search query and/or features of the tagged search result images).

It may be appreciated that tagging an untagged image recognition suggestion may be interpreted as tagging the untagged image represented by the untagged image recognition suggestion.

Confirmable thumbnails corresponding to one or more of the untagged image recognition suggestions may be presented. In one example, confirmable thumbnails may be presented in paged groups comprising a subset of the untagged image recognition suggestions. For example, a search result may comprise 500 untagged image recognition suggestions. Confirmable thumbnails may be presented in paged groups of 15/500. In this way, the user may find the task of tagging images less daunting than having the 500 images presented at one time. An untagged image of an untagged image recognition suggestion corresponding to a confirmable thumbnail may be tagged based upon receiving user confirmation of the confirmable thumbnail. In contrast, a confirmable thumbnail may be removed from the presented confirmable thumbnails and/or a corresponding untagged image recognition suggestion may be removed from the presented search results based upon receiving a user denial for the confirmable thumbnail.

In one example, a confirmable thumbnail may comprise a rescaled/resized version of an untagged image represented by an untagged image recognition suggestion (e.g., a zoomed in view of an individual's face, a scaled down view of an entire image). To aid in recognition and provide context of a zoomed in untagged image, an untagged image recognition suggestion corresponding to a confirmable thumbnail may be presented when a user interacts with the confirmable thumbnail. For example, the user may "mouse over" a confirmable thumbnail of a person's face. An untagged image from which the person's face was extracted may be presented (e.g., an untagged image of the person playing with a dog in a yard). In this way, a user may tag images based upon tagging suggestions and/or confirmable thumbnails of untagged images contextually related to a search/view task, while search and/or viewing tagged images.

In another example of presenting search results, a user search query of a person's name may be received. Tagged search result images having a tagged name corresponding to the person's name may be determined. Untagged image recognition suggestions having facial features corresponding to the recognized facial features of the tagged search result images may be determined. Search results comprising one or more of the untagged image recognition suggestions and/or one or more of the tagged search results images may be presented within a single search/view window. Tagging suggestions for the one or more untagged image recognition suggestions within the search results may be presented. Additionally, confirmable face shot thumbnails corresponding to one or more of the untagged image recognition suggestions may be presented. Tagging suggestions may be presented for the confirmable fact shot thumbnails.

Figure 2:
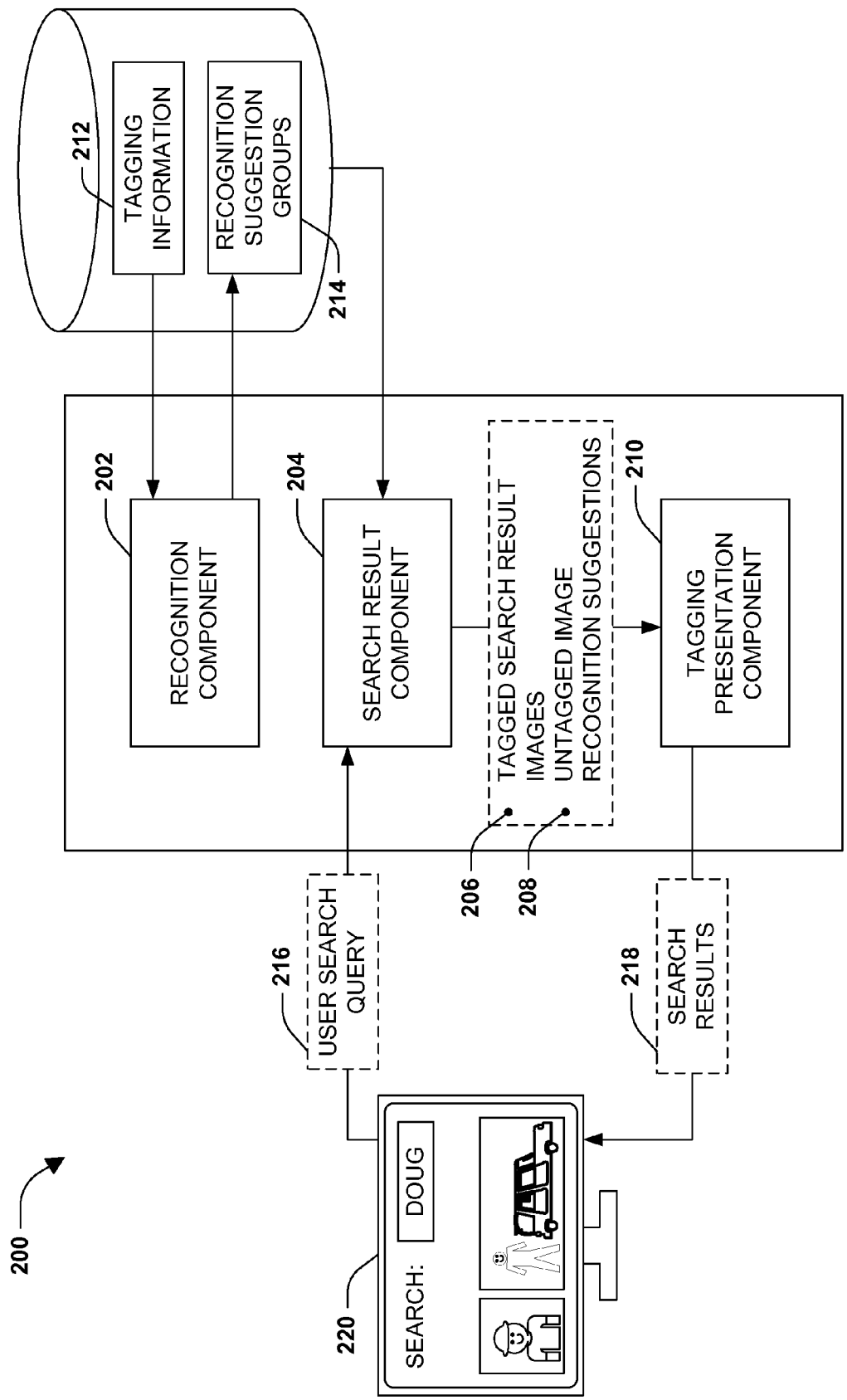
FIG. 2 is a component block diagram illustrating an exemplary system for presenting search results.

FIG. 2 illustrates an example of a system 200 configured for presenting search results 218. The system 200 may comprise a recognition component 202, a search result component 204, and/or a tagging presentation component 210. The recognition component 202 may be configured to organized untagged images into recognition suggestion groups 214. Untagged images may be organized based upon feature recognition matching techniques (e.g., facial recognition matching techniques, visual recognition matching techniques, etc.). In particular, a feature recognition matching technique may compare features of untagged images with recognized features of one or more tagged images. For example, a tagged image of a building may have an extracted feature of a domed roof and a tag of "The Stadium". In this way, untagged images have a similar domed roof feature may be grouped into a recognition suggestion group corresponding to "The Stadium". In one example, tagging information 212 and/or recognition suggestion groups 214 may be stored in a database for user search query matching and/or for determining tagging suggestions.

The search result component 204 may be configured to receive a user search query 216. In one example, a user may input a textual search for related images. In another example, a user may select an image tile corresponding to a tagged image as the user search query 216. If an image tile of a tagged image is selected, then the user search query 216 may be interpreted as tagged information of the tagged image. The user may refine the user search query 216 by limiting the search to images stored within a particular folder.

The search result component 204 may be configured to determine tagged search result images 206 corresponding to the user search query 216. Tagged search result images 206 may comprise tagged images having tagged information matching the user search query 216. For example, an image tagged as "The Tower" may be determined as a tagged search result image where the user search query is "Tower". The search result component 204 may be configured to determine untagged image recognition suggestions 208. It may be appreciated that, an untagged image recognition suggestion may relate to an untagged image having features corresponding to features of the tagged search result images 206 and/or the user search query 216. In one example, untagged image recognition suggestions 208 may comprise untagged images within a recognition suggestion group having features corresponding to features of the tagged search result images 206 and/or the user search query 216. In this way, the search result component 204 may determine tagged images and untagged images corresponding to the user search query 216.

The tagging presentation component 210 may be configured to present search results 218 comprising one or more of the untagged image recognition suggestions 208 and/or one or more of the tagged search result images 206. In one example, the search results 218 may be presented within a single search/view window 220.

The tagging presentation component 210 may be configured to present tagging suggestions for untagged image recognition suggestions 208 within the search results 218. For example, the tagging suggestion may comprise a suggested tag label (e.g., "Doug"), a confirmation option, a deny option, and/or other information. The tagging presentation component 210 may be configured to receive user input to confirm or deny a tagging suggestion. If the user input denies the tagging suggestion, then the tagging presentation component 210 may remove the untagged image recognition suggestion from the presented search results. If the user input confirms the tagging suggestion, then the tagging presentation component 210 may tag an untagged image represented by the untagged image recognition suggestion.

The tagging presentation component 210 may be configured to present confirmable thumbnails corresponding to one or more of the untagged image recognition suggestions 208. The tagging presentation component 210 may be configured to tag an untagged image represented by an untagged image recognition suggestion corresponding to a confirmable thumbnail based upon a user confirmation confirming the confirmable thumbnail. The tagging presentation component 210 may be configured to remove a confirmable thumbnail from the presented confirmable thumbnails and/or a corresponding untagged image recognition suggestion from the presented search results based upon a user denying the confirmable thumbnail. The tagging presentation component may be configured to receive user interaction with a confirmable thumbnail. In response to the user interaction, the tagging presentation component may present an untagged image recognition suggestion corresponding to a confirmable thumbnail.

In one example of presenting confirmable thumbnails, a first set of confirmable thumbnails corresponding to one or more of the untagged image recognition suggestions may be presented. A user may deny one or more of the confirmable thumbnails within the first set of confirmable thumbnails. The tagging presentation component 210 may be configured to remove the one or more confirmable thumbnails based upon the user denial. Subsequently, the user may confirm the remaining confirmable thumbnails within the first set of confirmable thumbnails using a single user input (e.g., a confirm all button). The tagging presentation component 210 may tag the remaining confirmable thumbnails based upon the user confirmation. Because the confirmable thumbnails within first set of confirmable thumbnails were denied or confirmed, the tagging presentation component 210 may present a second set of confirmable thumbnails different from the first set of confirmable thumbnails.

It may be appreciated that one or more the recognition suggestions groups may be updated. In particular, a recognition suggestion group may be updated based upon an untagged image recognition suggestion and/or a confirmable thumbnail being confirmed (tagged) or denied (removed). In one example, a user may confirm a confirmable thumbnail. An untagged image recognition suggestion corresponding to the confirmable thumbnail may be removed from a recognition suggestion group because the untagged image recognition suggestion is now tagged. In another example, a user may deny a tagging suggestion for an untagged image recognition suggestion. Because the tagging suggestion was incorrect, the untagged image recognition suggestion and/or other related untagged images within a recognition suggestion group may be ungrouped and/or regrouped into different recognition suggestion groups. In this way, the recognition component 202 may "learn" based upon user confirmation/denial of tagging suggestions and/or confirmable thumbnails.

Figure 3:
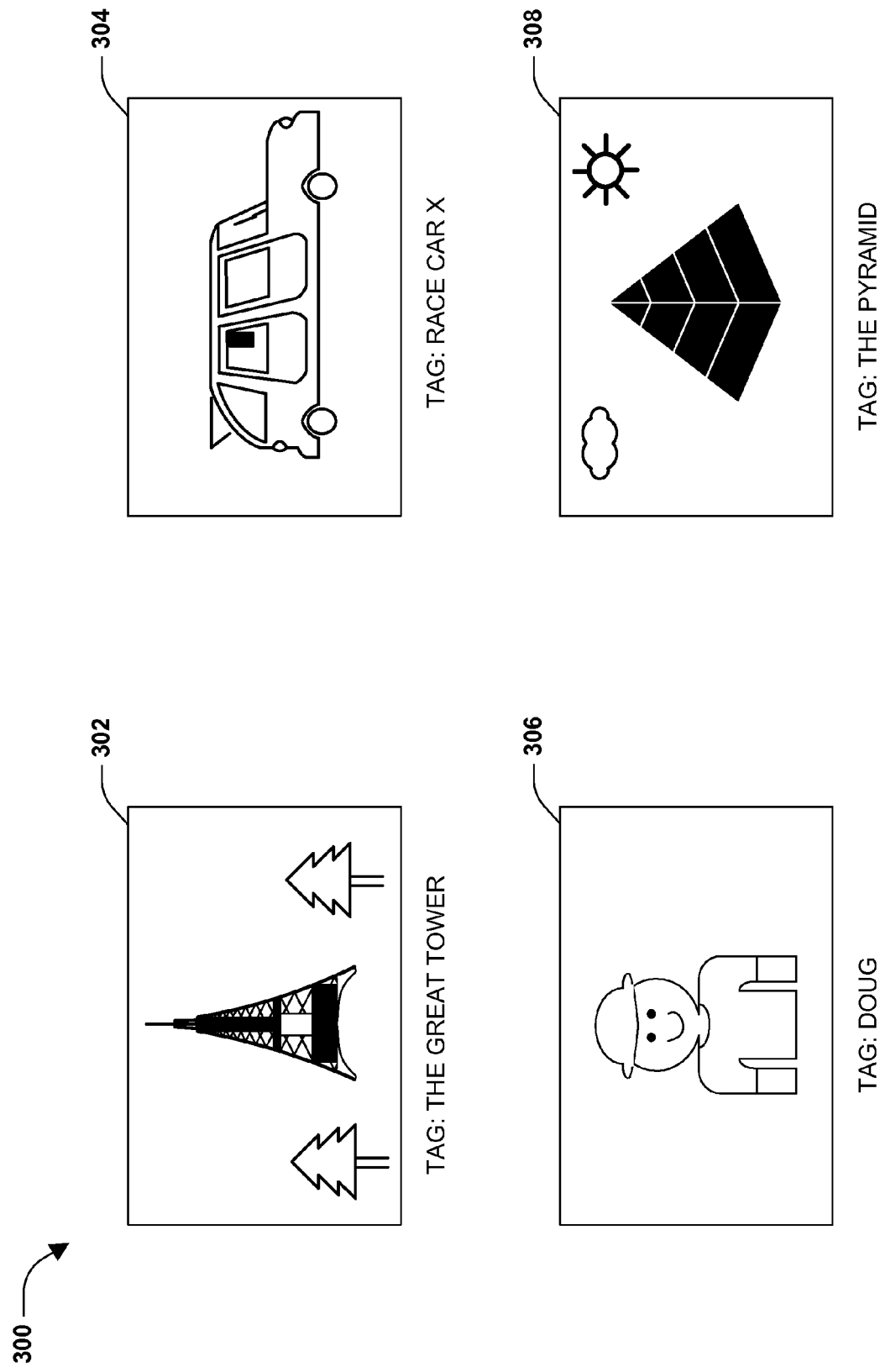
FIG. 3 is an illustration of an example of tagged images that may be used as tagged search result images.

FIG. 3 illustrates an example 300 of tagged images that may be used as tagged search result images. Images may be tagged with tagged information describing the image and/or objects within the image. For example, tower image 302 may be tagged as "The Great Tower", car image 304 may be tagged as "Race Car X", person image 306 may be tagged as "Doug", monument image 308 may be tagged as "The Pyramid", etc. Tagged information may be used to organize, search, and/or provide additional information about images, such as tagging suggestions. For example, a user may submit a user search query "Doug". Tagged images having tagged information relating to "Doug" may be retrieved and provided to the user. The person image 306 may be return as a tagged search result image because the tag "Doug" matches the user search query "Doug".

It may be appreciated that a tagged image may be tagged with more than one tag. For example, an image may have a person next to a car. The image may be tagged with a first tag "Doug" and a second tag "Sports Car X".

It may be advantageous to provide untagged images along with the tagged search result images. The untagged images may have features (e.g., visual features, textual features, and/or other descriptive features) that may be used to compare with recognized features of tagged images. Thus, when a tagged image is returned as a tagged search result image, untagged images having similar features as the tagged image may also be returned. In this way, a user may search, view, and tag images contextually relevant to a user search query without switching into a tagging-centric mode.

It may be appreciated that an untagged image may have more than one feature. For example, an untagged image may have a first feature of a person's face and a second feature of a car body style. Thus, an untagged image may be determined as an untagged image recognition suggestion for one or more user search queries. Furthermore, an untagged image may be grouped in one or more recognition suggestion groups.

Figure 4:
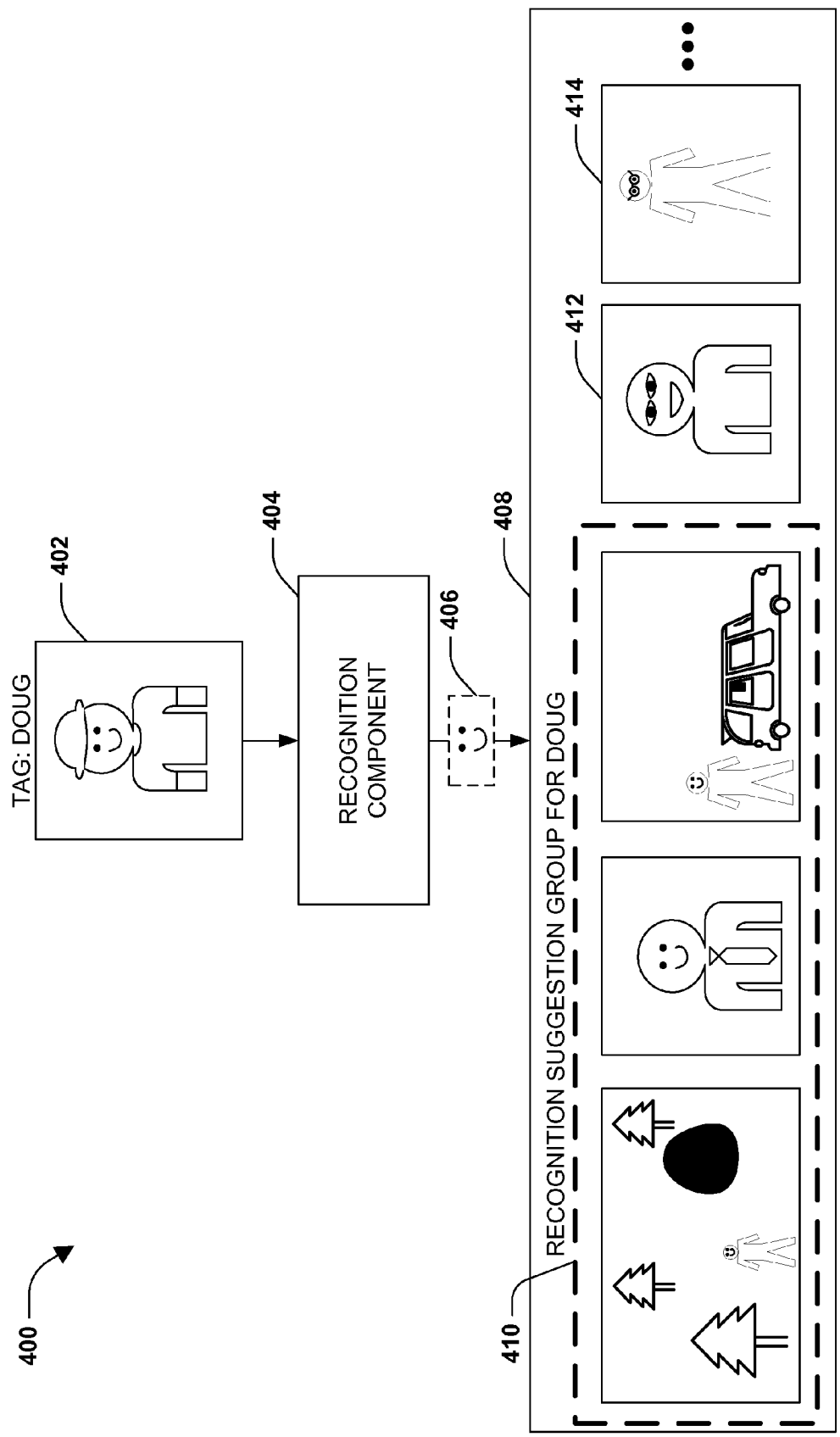
FIG. 4 is an illustration of an example of a recognition component grouping untagged images into a recognition suggestion group based upon visual features of a tagged image.

FIG. 4 illustrates an example 400 of a recognition component 404 grouping untagged images into a recognition suggestion group 410 based upon visual features 406 of a tagged image 402. A tagged image 402 may have been tagged as "Doug" by a user based upon a name of a person depicted within the tagged image 402. The recognition component 404 may be configured to recognize features of the tagged image 402 based upon visual features. For example, eye features and mouth features may be determined as visual features 406 of the tagged image 402.

The recognition component 404 may be configured to compare the visual features 406 of the tagged image 402 with features of untagged images 408. In this way, untagged images may be organized into recognition suggestion groups. For example, untagged images may be organized into a recognition suggestion group 410 corresponding to the visual features 406 of the tagged image 402. In particular, three untagged images are grouped into the recognition suggestion group 410 because the three untagged images may comprise features similar to the visual features 406 (e.g., a lake scene comprising a person with eyes and a mouth similar to visual features 406, a business person with eyes and a mouth similar to visual features 406, and a car next to a person with eyes and a mouth similar to visual features 406). However, the recognition component 404 may exclude untagged image 412 and untagged image 414 because the untagged images do not comprise features similar to the visual features 406. In this way, untagged images 408 may be grouped into recognition suggestion groups based upon untagged images having features similar to features of tagged images.

Figure 5:
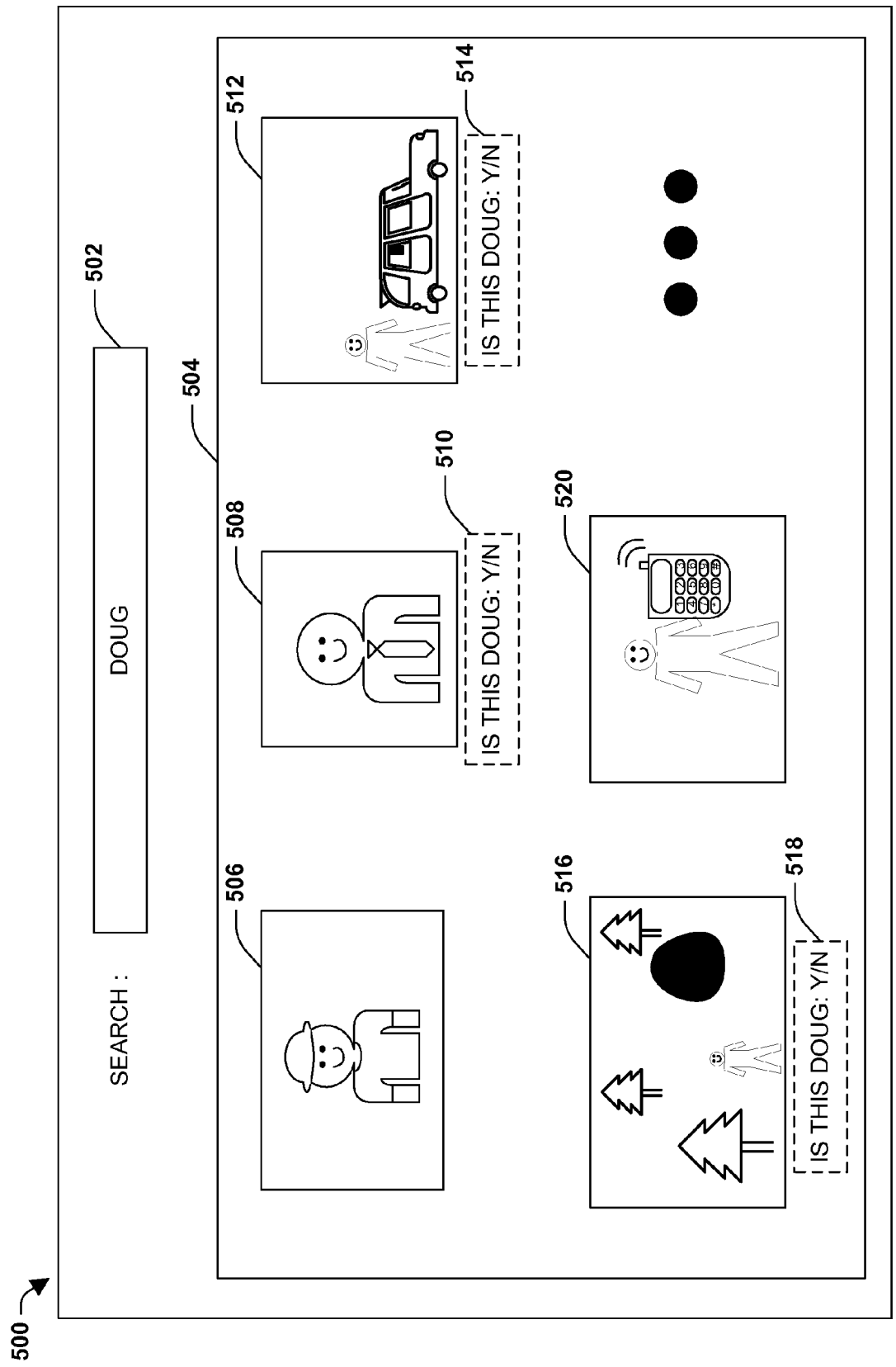
FIG. 5 is an illustration of an example of presenting search results in response to a user search query within an image management platform.

FIG. 5 illustrates an example 500 of presenting search results 504 in response to a user search query 502 within an image management platform. The image management platform may allow a user to browse, view, organize, share, modify, tag, and/or perform other operations related to images. For example, a user may submit the user search query 502 "Doug". The user search query 502 "Doug" may be used to retrieve tagged images and/or untagged images having some relation to "Doug".

In particular, tagged images having tags corresponding to "Doug" may be determined as tagged search result images. For example, a tagged image 506 illustrating a man in a hat may be tagged "Doug at a construction site", a tagged image 520 illustrating a man with a cell phone may be tagged "Doug's new phone", and/or other tagged images may be determined as tagged search result images. Additionally, untagged images having features corresponding to recognized features of tagged search result images (e.g., facial features and/or other features visually extracted from tagged image 506 and/or tagged image 520) and/or the user search query "Doug" may be determined as untagged image recognition suggestions. An untagged image 508 illustrating a man in a tie, an untagged image 512 illustrating a man near a car, an untagged image 516 of a man near a lake, and/or other untagged images may be determined as untagged image recognition suggestions. In one example, untagged image recognition suggestions may be determined based upon visually extracted facial features of untagged images corresponding to facial features of the tagged search result images (e.g., a similarity between eye features and mouth features).

The tagged search result images (506, 520, etc.) and the untagged image recognition suggestions (508, 512, 516) may be presented as search results 504. Tagging suggestions may be presented for the untagged image recognition suggestions (e.g., tagging suggestions 510, 514, 518, etc.). A user may confirm, deny, or ignore the tagging suggestions while viewing the search results 504.

Figure 6:
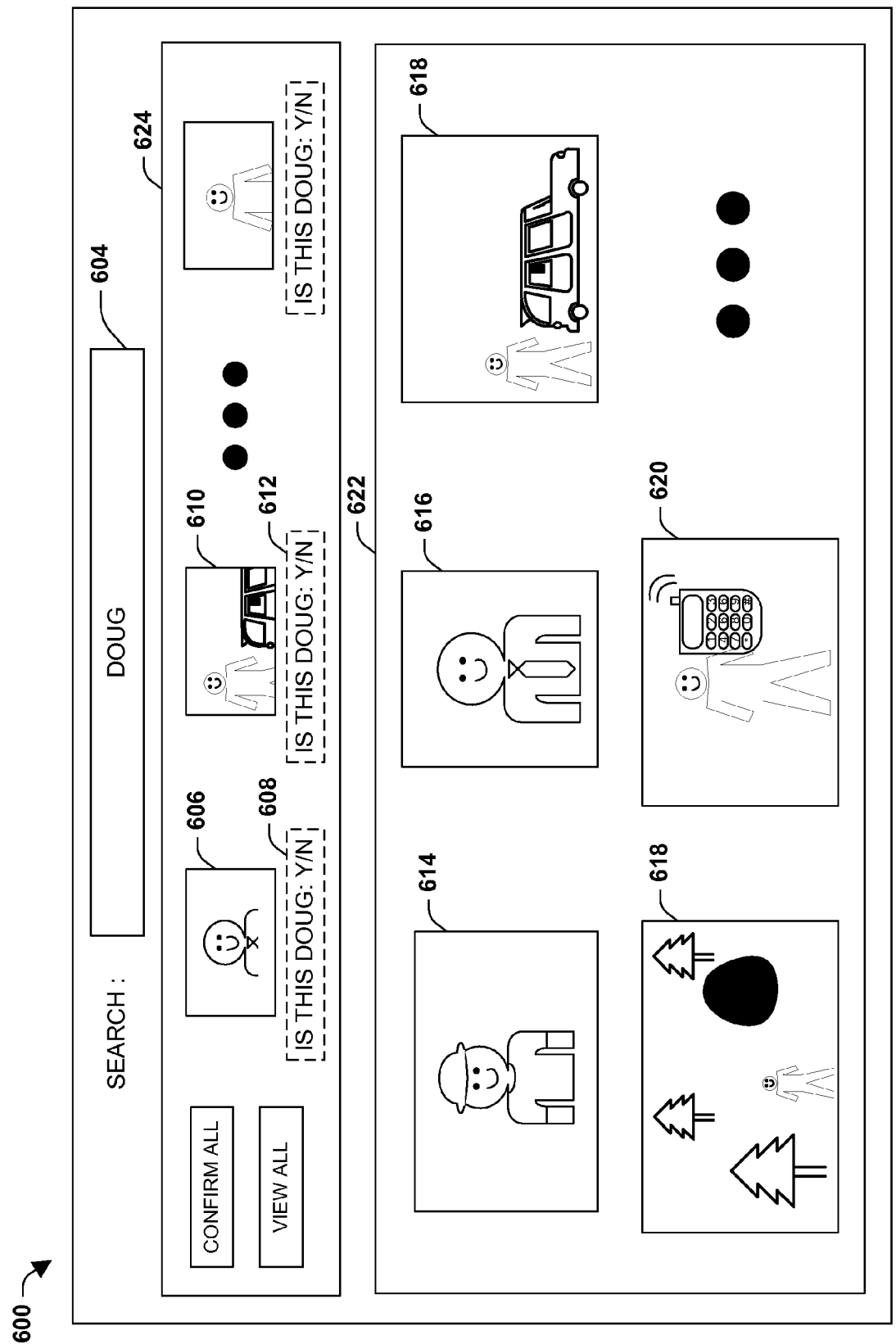
FIG. 6 is an illustration of an example of presenting search results and confirmable thumbnails in response to a user search query.

FIG. 6 illustrates an example 600 of presenting search results 622 and confirmable thumbnails 624 in response to a user search query 604. A user may submit the user search query 604 "Doug". Tagged images (e.g., tagged image 614, tagged image 620, and/or other tagged images) corresponding to "Doug" may be determined as tagged search result images. Untagged images (e.g., untagged image 616, untagged images 618, untagged image 618, and/or other untagged images) corresponding to "Doug" and/or recognized features of the tagged search result images (e.g., facial features of Doug) may be determined as untagged image recognition suggestions. The tagged search result images and the untagged image recognition suggestions may be presented as search results 622.

In addition, confirmable thumbnails 624 corresponding to one or more of the untagged image recognition suggestions may be presented. For example, confirmable thumbnail 606 is a zoomed in facial view of the man in untagged image 616, confirmable thumbnail 610 is a zoomed in facial view of the man in untagged image 618, etc. Confirmable thumbnails may be confirmed or denied for tagging. For example, confirmable thumbnail 606 may comprise a confirm/deny option 608 and confirmable thumbnail 610 may comprise a confirm/deny option 612. While browsing/viewing search results 622, the user may view and/or tag untagged images through the confirmable thumbnails 624.

Figure 7:
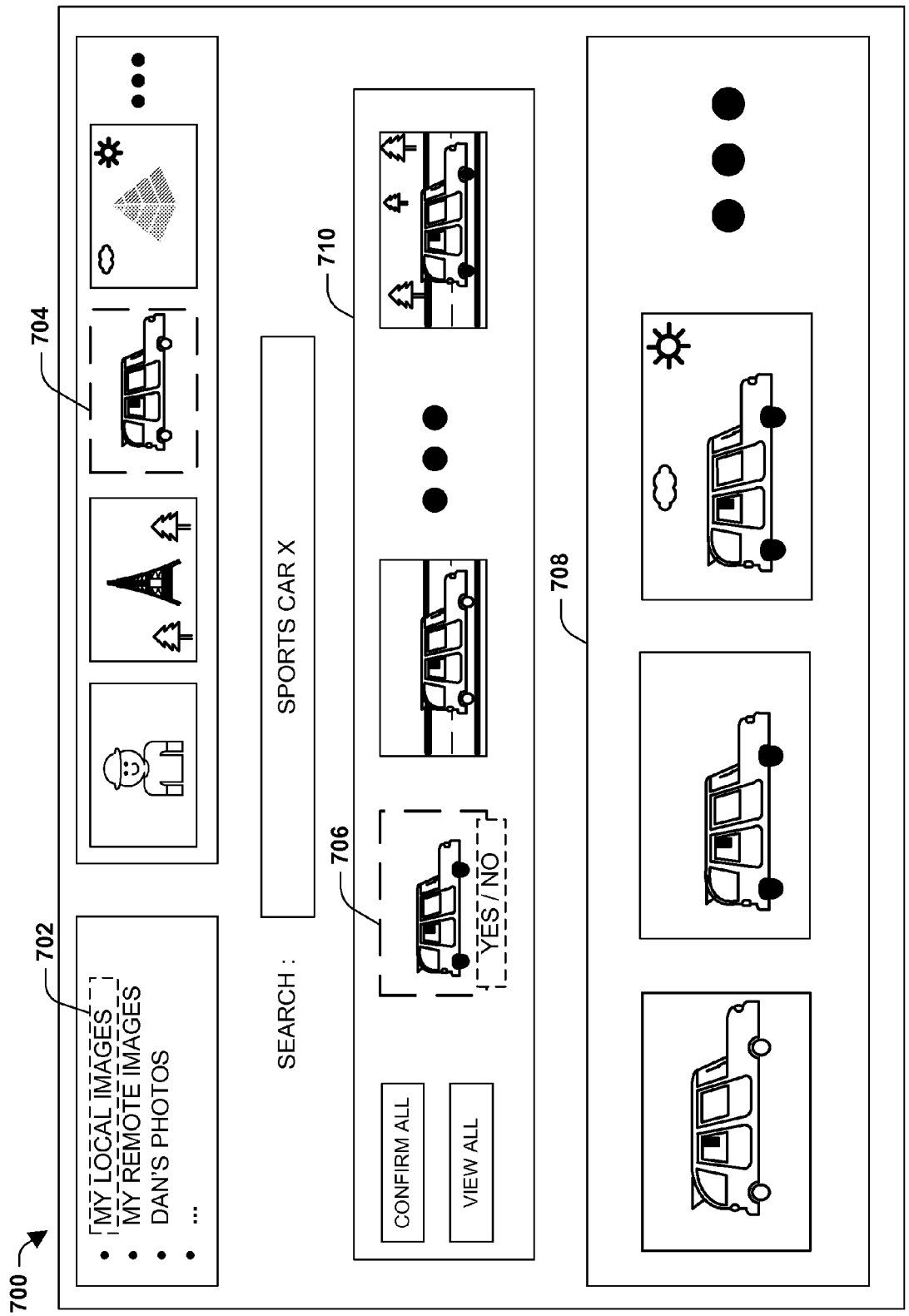
FIG. 7 is an illustration of an example of presenting search results and confirmable thumbnails in response to user selection comprising a folder selection and an image tile selection.

FIG. 7 illustrates an example 700 of presenting search results 708 and confirmable thumbnails 710 in response to user selection comprising a folder selection 702 and an image tile selection 704. It may be appreciated that images may be stored in a variety of folders and/or locations. For example, images may be stored on a USB key, a memory stick, a folder on a hard disk, a remote internet storage location, and/or a variety of other locations. Because a user may be associated with thousands of images, a user search query may be limited based upon the folder selection 702 and/or the image tile selection 704. The folder selection 702 may be used to narrow search results 708 and/or confirmable thumbnails 710 to images stored at a location corresponding to the folder selection 702.

It may be appreciated that one or more tagged images may be presented as image tiles. The image tiles allow a user to easily select a tagged image as a user search query. In particular, a tag (e.g., "Sports Car X") corresponding to the tagged image represented by an image tile (e.g., Sports Car image tile) may be used as the user search query. For example, a user may have tagged an image of a man, an image of a tower, an image of a car, an image of a pyramid, and/or other tagged images. The tagged images may be presented as image tiles.

In one example, the user may select "My Local Images" folder as a search constraint (e.g., folder selection 702). The user may select the Sports Car image tile corresponding to a tagged image of a car having a tag "Sports Car X" (e.g., image tile selection 704). In this way, search results 708 comprising tagged search result images and untagged image recognition suggestions may be presented based upon a "Sports Car X" user search query constrained to images located in a My Local Images folder.

Confirmable thumbnails corresponding to the "Sports Car X" user search query constrained to images located in the My Local Images folder may be presented. The user may confirm, deny, or ignore the confirmable thumbnails 710. For example, the user may confirm a confirmable thumbnail 706 corresponding to an untagged image recognition suggestion related to an untagged image of a car. In this way, the untagged image of the car may be tagged "Sports Car X".

Figure 8:
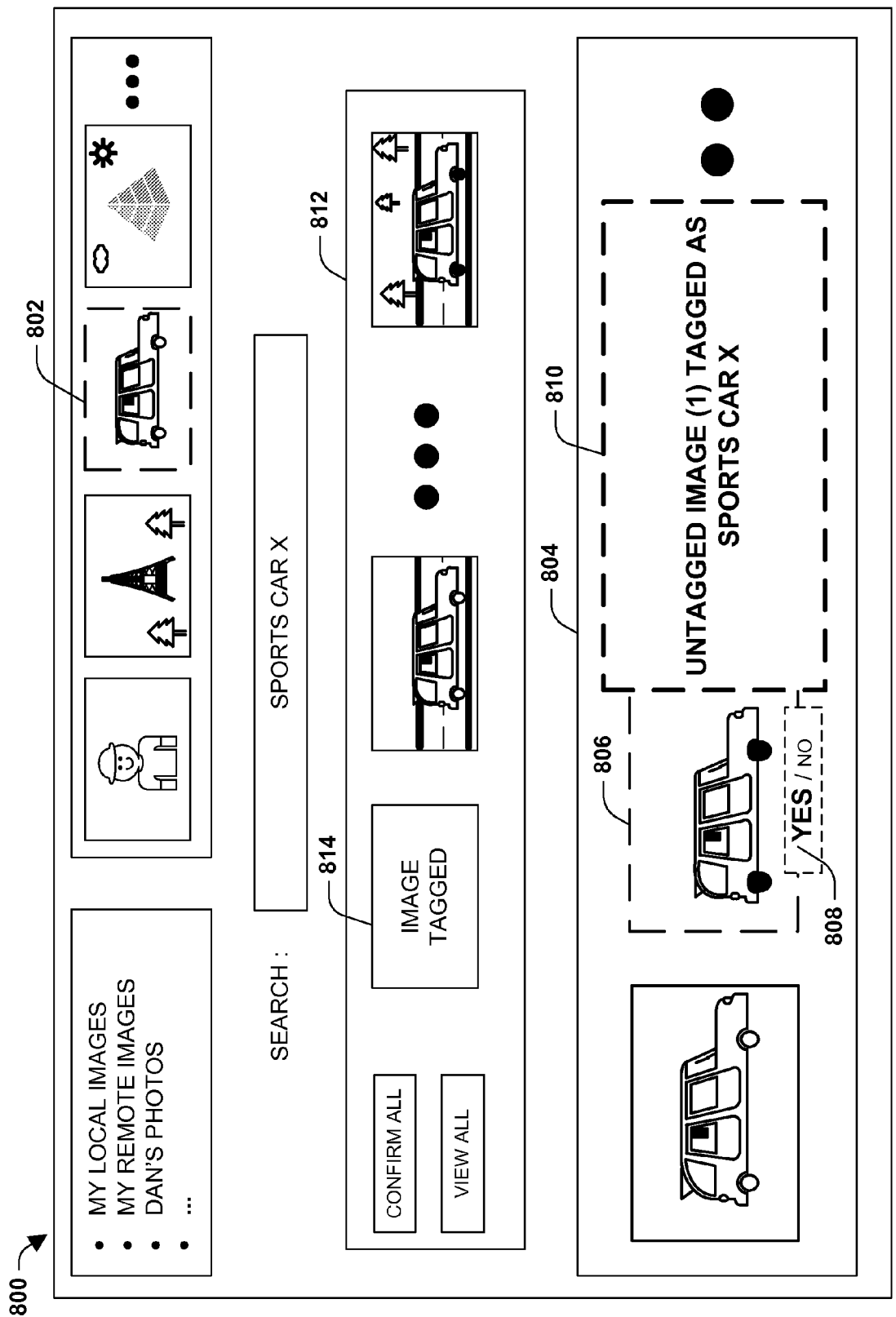
FIG. 8 is an illustration of an example of tagging an untagged image represented by an untagged image recognition suggestion based upon user input confirming a tagging suggestion.

FIG. 8 illustrates an example 800 of tagging an untagged image represented by an untagged image recognition suggestion 806 based upon user input confirming a tagging suggestion 808. A user may select an image tile 802 corresponding to a previously tagged image having a tag "Sports Car X". In this way, a user search query may be interpreted as "Sports Car X" or some variation. Search results 804 may comprise tagged search result images corresponding to the user search query "Sports Car X". The search results 804 may also comprise untagged image recognition suggestions corresponding to the user search query "Sports Car X" and/or extracted features of tagged search result images (e.g., a car body style). Additionally, confirmable thumbnails 812 corresponding to one or more of the untagged image recognition suggestions may be presented.

In one example, a user may "mouse over" the untagged image recognition suggestion 806. In response to the "mouse over", the tagging suggestion 808 may be presented. The tagging suggestion 808 may allow the user to confirm or deny the tagging suggestion 808. For example, the user may confirm the tagging suggestion 808. In response to the confirmation of the tagging suggestion 808, untagged image (1) represented by the untagged image recognition suggestion 806 may be tagged 810 as Sports Car X. In addition, a confirmable thumbnail 814 corresponding to the untagged image recognition suggestion 806 representing the newly tagged image (1) may be removed from the confirmable thumbnails 814 because the newly tagged image (1) of the confirmable thumbnail 814 is now tagged. In this way, the user is able to tag images while search and viewing untagged and tagged images.

Figure 9:
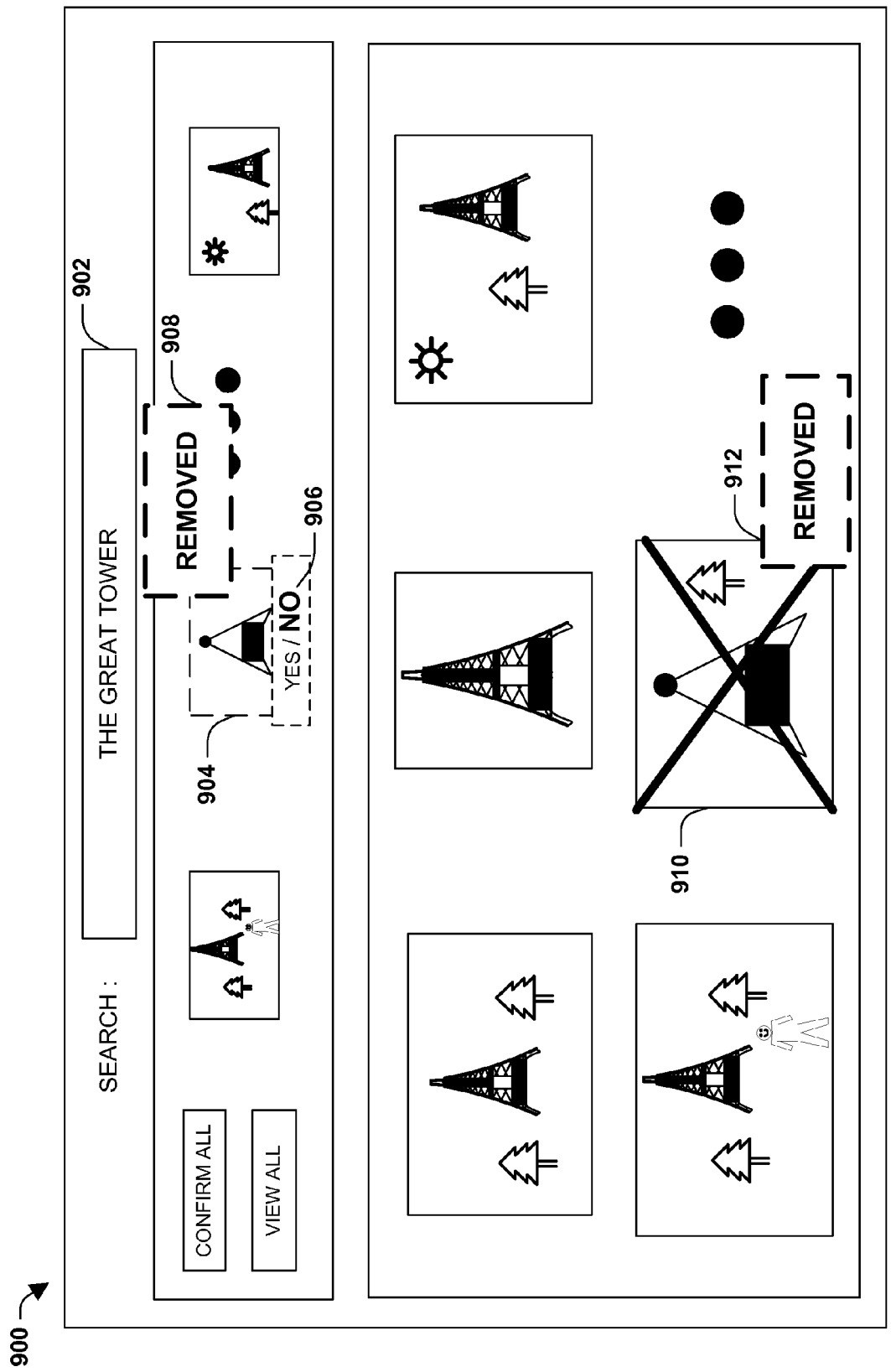
FIG. 9 is an illustration of an example of removing a confirmable thumbnail and a corresponding untagged image recognition suggestion in response to a user denying the confirmable thumbnail.

FIG. 9 illustrates an example 900 of removing a confirmable thumbnail 904 and a corresponding untagged image recognition suggestion 910 in response to a user denying 906 the confirmable thumbnail 904. A user may submit a user search query 902 "The Great Tower". In response to the user search query 902, search results and confirmable thumbnails may be presented. The user may be able to confirm, deny, or ignore the confirmable thumbnails. For example, a user may deny 906 the confirmable thumbnail 904 corresponding to an untagged image recognition suggestion 910 of an untagged image illustrating a building structure near a tree. Because the user denied 906 the confirmable thumbnail 904, the confirmable thumbnail 904 may be removed 908 from the confirmable thumbnails. In addition, the corresponding untagged image recognition suggestion 910 may be removed 912 from the presented search results.

In one example, a feature recognition matching component and/or technique may be updated based upon the user input denying 906 the confirmable thumbnail 904. In particular, one or more of the features of the denied untagged image (e.g., a sphere feature at the top of the structure) may be deemed as not relating to features of tagged images having tags similar to "The Great Tower". Additionally, the denied untagged image may be removed from a recognition suggestion group corresponding to the tag "The Great Tower". In this way, the feature recognition matching component and/or technique may learn based upon user tagging interactions.

Figure 10:
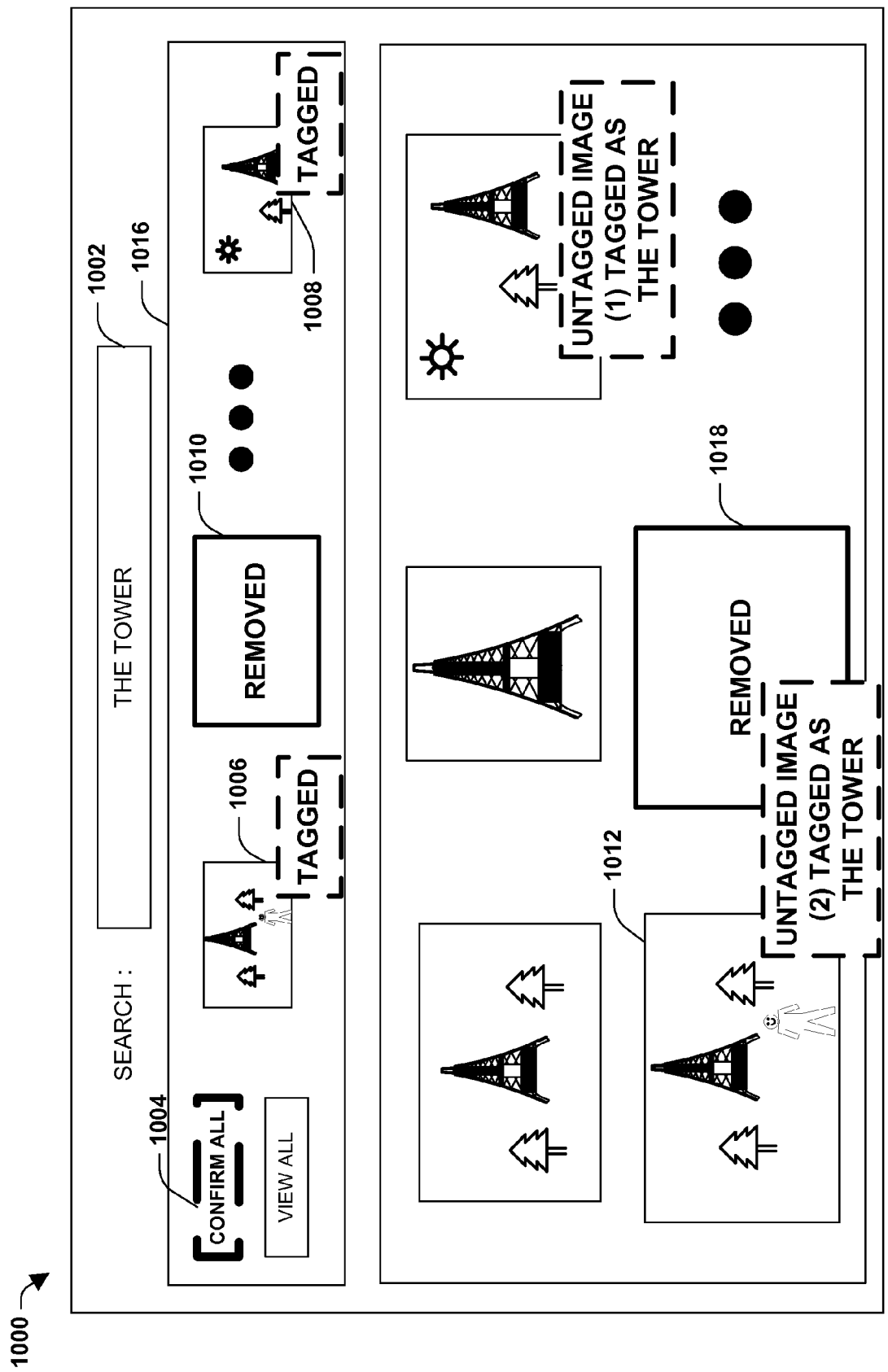
FIG. 10 is an illustration of an example of a user denying a confirmable thumbnail and subsequently confirming remaining confirmable thumbnails.

FIG. 10 illustrates an example 1000 of a user denying a confirmable thumbnail 1010 and subsequently confirming all remaining confirmable thumbnails. A user may submit a user search query 1002 "The Tower". In response to the user search query 1002, search results and confirmable thumbnails may be presented. It may be appreciated that confirmable thumbnails may be presented in a paged view (e.g., page (1) comprises thumbnails 1-10, page (2) comprises confirmable thumbnails 11-20, etc.) to allow a user to view a manageable number of confirmable thumbnails at one time (e.g., 10 thumbnails at one time).

A first page 1016 of confirmable thumbnails is presented. The first page 1016 may comprise a portion of the total number of confirmable thumbnails available. In one example, the user may deny a confirmable thumbnail 1010. In response to the user denial, the confirmable thumbnail 1010 may be removed from the first page 1016, and a corresponding untagged image recognition suggestion 1018 may be removed from the search results. Next, the user may invoke the confirm all button 1004. In response, the remaining confirmable thumbnails within the first page 1016 may be tagged (e.g., confirmable thumbnail 1006, confirmable thumbnail 1008, etc.). Tagging confirmations for the confirmed remaining confirmable thumbnails may be presented at or near respective confirmable thumbnails and/or corresponding untagged image recognition suggestions. Because the confirmable thumbnails within the first page 1016 are either removed or confirmed, a second page of different confirmable thumbnails may be presented.

In one example, an untagged image may illustrate a man near a tower. An untagged image recognition suggestion 1012 corresponding to the untagged image may be presented within the search results. In addition, the confirmable thumbnail 1006 corresponding to the untagged image recognition suggestion 1012 may be presented. A user may confirm the confirmable thumbnail 1006 and/or other confirmable thumbnails using the confirm all button 1004. In this way, a tagging confirmation for the untagged image may be presented at or near the confirmable thumbnail 1006 and/or the untagged image recognition suggestion 1012 because the corresponding untagged image is now tagged as The Tower.

Figure 11:
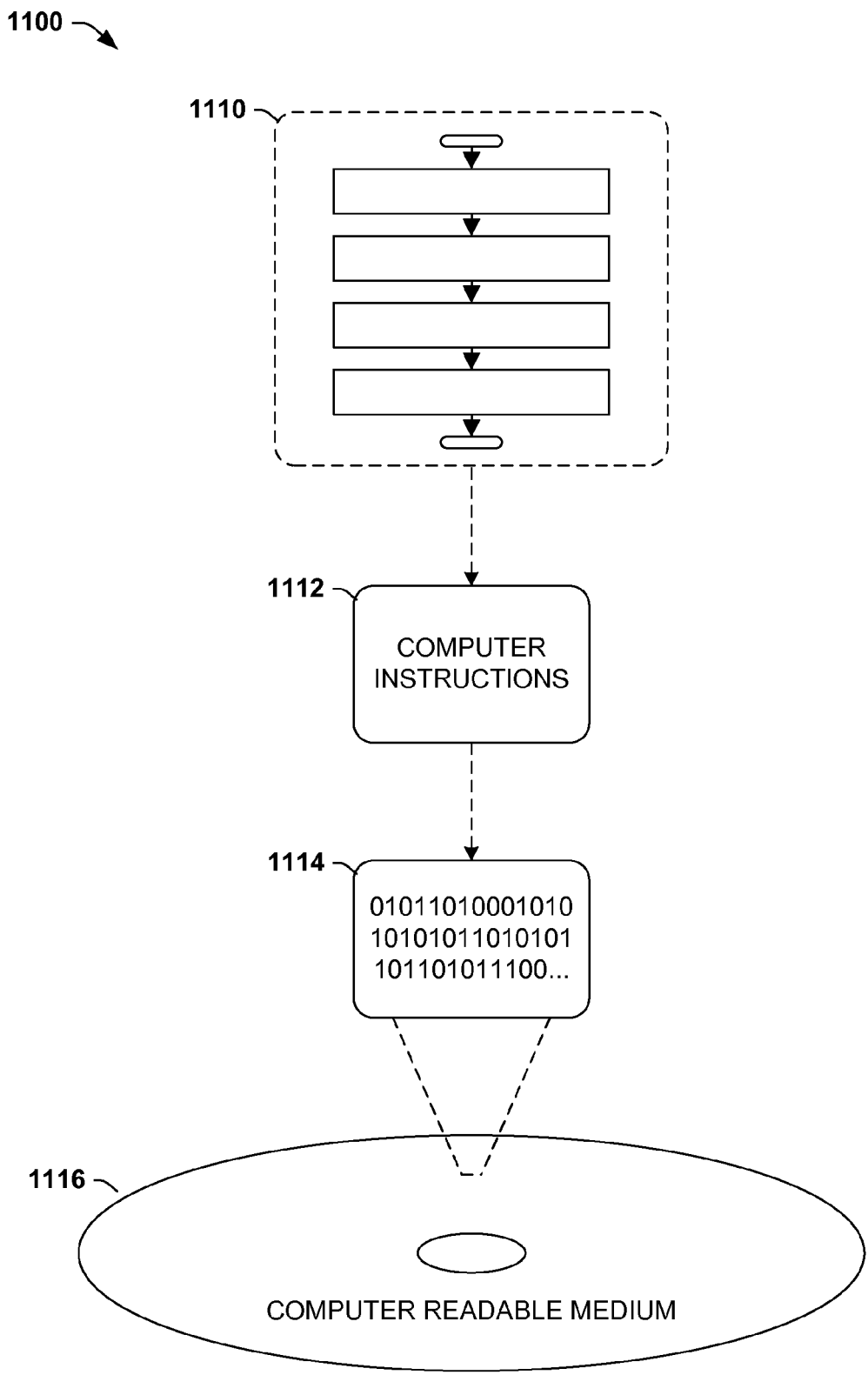
FIG. 11 is an illustration of an exemplary computer-readable medium wherein processor-executable instructions configured to embody one or more of the provisions set forth herein may be comprised.

Still another embodiment involves a computer-readable medium comprising processor-executable instructions configured to implement one or more of the techniques presented herein. An exemplary computer-readable medium that may be devised in these ways is illustrated in FIG. 11, wherein the implementation 1100 comprises a computer-readable medium 1116 (e.g., a CD-R, DVD-R, or a platter of a hard disk drive), on which is encoded computer-readable data 1114. This computer-readable data 1114 in turn comprises a set of computer instructions 1112 configured to operate according to one or more of the principles set forth herein. In one such embodiment 1100, the processor-executable computer instructions 1112 may be configured to perform a method 1110, such as the exemplary method 100 of FIG. 1, for example. In another such embodiment, the processor-executable instructions 1112 may be configured to implement a system, such as the exemplary system 200 of FIG. 2, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 12:
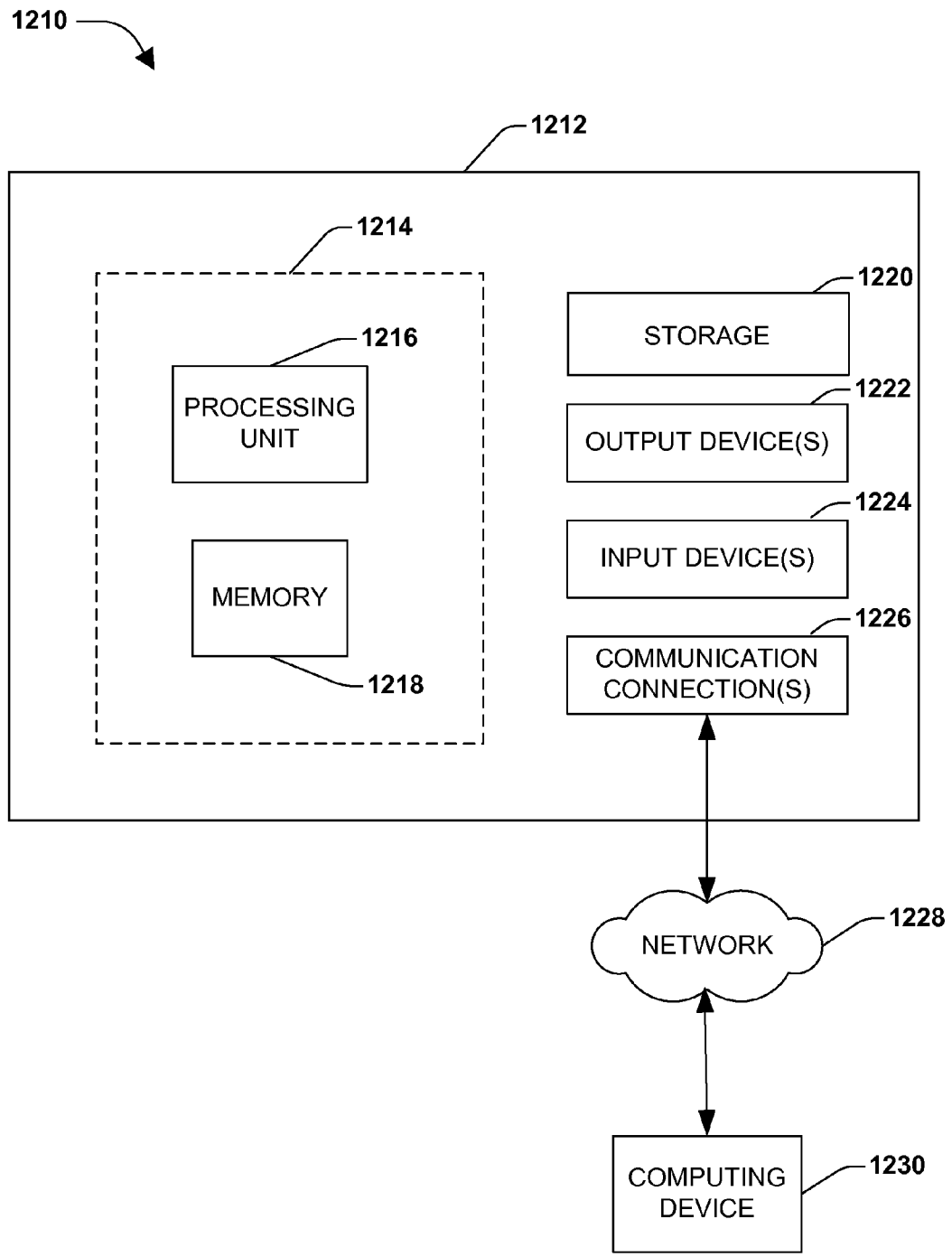
FIG. 12 illustrates an exemplary computing environment wherein one or more of the provisions set forth herein may be implemented.

FIG. 12 and the following discussion provide a brief, general description of a suitable computing environment to implement embodiments of one or more of the provisions set forth herein. The operating environment of FIG. 12 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 12 illustrates an example of a system 1210 comprising a computing device 1212 configured to implement one or more embodiments provided herein. In one configuration, computing device 1212 includes at least one processing unit 1216 and memory 1218. Depending on the exact configuration and type of computing device, memory 1218 may be volatile (such as RAM, for example), non-volatile (such as ROM, flash memory, etc., for example) or some combination of the two. This configuration is illustrated in FIG. 12 by dashed line 1214.

In other embodiments, device 1212 may include additional features and/or functionality. For example, device 1212 may also include additional storage (e.g., removable and/or non-removable) including, but not limited to, magnetic storage, optical storage, and the like. Such additional storage is illustrated in FIG. 12 by storage 1220. In one embodiment, computer readable instructions to implement one or more embodiments provided herein may be in storage 1220. Storage 1220 may also store other computer readable instructions to implement an operating system, an application program, and the like. Computer readable instructions may be loaded in memory 1218 for execution by processing unit 1216, for example.

The term "computer readable media" as used herein includes computer storage media. Computer storage media includes volatile and nonvolatile, removable and non-removable media implemented in any method or technology for storage of information such as computer readable instructions or other data. Memory 1218 and storage 1220 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1212. Any such computer storage media may be part of device 1212.

Device 1212 may also include communication connection(s) 1226 that allows device 1212 to communicate with other devices. Communication connection(s) 1226 may include, but is not limited to, a modem, a Network Interface Card (NIC), an integrated network interface, a radio frequency transmitter/receiver, an infrared port, a USB connection, or other interfaces for connecting computing device 1212 to other computing devices. Communication connection(s) 1226 may include a wired connection or a wireless connection. Communication connection(s) 1226 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 1212 may include input device(s) 1224 such as keyboard, mouse, pen, voice input device, touch input device, infrared cameras, video input devices, and/or any other input device. Output device(s) 1222 such as one or more displays, speakers, printers, and/or any other output device may also be included in device 1212. Input device(s) 1224 and output device(s) 1222 may be connected to device 1212 via a wired connection, wireless connection, or any combination thereof. In one embodiment, an input device or an output device from another computing device may be used as input device(s) 1224 or output device(s) 1222 for computing device 1212.

Components of computing device 1212 may be connected by various interconnects, such as a bus. Such interconnects may include a Peripheral Component Interconnect (PCI), such as PCI Express, a Universal Serial Bus (USB), firewire (IEEE 13124), an optical bus structure, and the like. In another embodiment, components of computing device 1212 may be interconnected by a network. For example, memory 1218 may be comprised of multiple physical memory units located in different physical locations interconnected by a network.

Those skilled in the art will realize that storage devices utilized to store computer readable instructions may be distributed across a network. For example, a computing device 1230 accessible via a network 1228 may store computer readable instructions to implement one or more embodiments provided herein. Computing device 1212 may access computing device 1230 and download a part or all of the computer readable instructions for execution. Alternatively, computing device 1212 may download pieces of the computer readable instructions, as needed, or some instructions may be executed at computing device 1212 and some at computing device 1230.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method for presenting search results, comprising:
   receiving a user search query;
   determining one or more tagged search result images corresponding to the user search query;
   determining one or more untagged image recognition suggestions corresponding to at least one of:
      recognized features of at least one of the one or more tagged search result images; or
      the user search query;
   presenting, in a first portion of a display, search results comprising at least some of the one or more untagged image recognition suggestions and at least some of the one or more tagged search result images;
   presenting, in a second portion of the display, one or more confirmable thumbnails corresponding to at least one of the one or more untagged image recognition suggestions; and
   removing a confirmable thumbnail from the second portion of the display and removing an untagged image recognition suggestion corresponding to the confirmable thumbnail from the first portion of the display based upon receiving a user denial for the confirmable thumbnail.

2. The method of claim 1, comprising:
   displaying the first portion of the display and the second portion of the display concurrently.

3. The method of claim 1, the first portion different than the second portion.

4. The method of claim 1, comprising
tagging a second untagged image recognition suggestion corresponding to a second confirmable thumbnail based upon receiving a user confirmation of the second confirmable thumbnail.

5. The method of claim 1, comprising:
presenting a tagging suggestion for a second untagged image recognition suggestion;
receiving user input to confirm or deny the tagging suggestion; and
if the user input confirms the tagging suggestion, then tagging the second untagged image recognition suggestion.

6. The method of claim 1, the confirmable thumbnail comprising a resealed version of the untagged image recognition suggestion.

7. The method of claim 1, the determining one or more untagged image recognition suggestions comprising:
retrieving a predetermined group of untagged images designated as relating to a tagged search result image.

8. The method of claim 1, the user search query comprising a selected tagged image.

9. A system for presenting search results, comprising:
one or more processing units; and
memory comprising instructions that when executed by at least some of the one or more processing units implement at least some of:
  a search result component configured to:
    receive a user search query;
    determine one or more tagged search result images corresponding to the user search query; and
    determine one or more untagged image recognition suggestions corresponding to at least one of:
      recognized features of at least one of the one or more tagged search result images; or
      the user search query; and
  a tagging presentation component configured to:
    present search results comprising at least some of the one or more untagged image recognition suggestions and at least some of the one or more tagged search result images;
    present one or more confirmable thumbnails corresponding to at least one of the one or more untagged image recognition suggestions; and
    remove at least one of a confirmable thumbnail or an untagged image recognition suggestion corresponding to the confirmable thumbnail based upon receiving a user denial for the confirmable thumbnail.

10. The system of claim 9, the presented search results presented in a first portion of a display, the presented one or more confirmable thumbnails presented in a second portion of the display, the first portion of the display and the second portion of the display displayed concurrently.

11. The system of claim 9, the confirmable thumbnail comprising a resealed version of the untagged image recognition suggestion.

12. The system of claim 9, the tagging presentation component configured to:
tag a second untagged image recognition suggestion corresponding to a second confirmable thumbnail based upon receiving a user confirmation of the second confirmable thumbnail.

13. The system of claim 9, the tagging presentation component configured to:
present a tagging suggestion for a second untagged image recognition suggestion;
receive user input to confirm or deny the tagging suggestion; and
tag the second untagged image recognition suggestion based upon user input confirming the tagging suggestion.

14. The system of claim 9, the tagging presentation component configured to:
receive a user interaction with a second confirmable thumbnail; and
present a second untagged image recognition suggestion corresponding to the second confirmable thumbnail.

15. The system of claim 9, the tagging presentation component configured to:
update a recognition suggestion group based upon user input confirming or denying at least one of a tagging suggestion or a second confirmable thumbnail.

16. The system of claim 9, the tagging presentation component configured to:
present a first set of confirmable thumbnails;
remove a second confirmable thumbnail from the first set of confirmable thumbnails based upon user input denying the second confirmable thumbnail; and
tag one or more remaining confirmable thumbnails within the first set of confirmable thumbnails based upon a single user input confirming the one or more remaining confirmable thumbnails.

17. The system of claim 16, the tagging presentation component configured to:
present a second set of confirmable thumbnails different from the first set of confirmable thumbnails.

18. The system of claim 9, the tagging presentation component configured to:
tag a second untagged image recognition suggestion with the user search query based upon a user confirming a tagging suggestion relating to the second untagged image recognition suggestion.

19. The system of claim 9, the user search query comprising a selected tagged image, the search result component configured to:
receive the user search query based upon a user selecting a folder and an image tile corresponding to the selected tagged image, the user search query corresponding to the folder and a tag of the selected tagged image.

20. A computer readable storage medium excluding signals comprising instructions that when executed at least in part via a processing unit perform a method for presenting search results, comprising:
receiving a user search query;
determining one or more untagged image recognition suggestions corresponding to at least one of:
  recognized features of one or more tagged search result images; or
  the user search query; and
presenting search results comprising at least some of the one or more untagged image recognition suggestions;
presenting one or more confirmable thumbnails corresponding to at least one of the one or more untagged image recognition suggestions; and
removing at least one of a confirmable thumbnail or an untagged image recognition suggestion corresponding to the confirmable thumbnail from the presented search results based upon receiving a user denial for the confirmable thumbnail.

* * * * *